United States Patent
Lievens et al.

(10) Patent No.: US 8,591,762 B2
(45) Date of Patent: Nov. 26, 2013

(54) COOLANT FORMULATIONS

(75) Inventors: Serge S. Lievens, Merelbeke (BE); Jurgen P. De Kimpe, Ghent (BE)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/279,003

(22) Filed: Oct. 21, 2011

(65) Prior Publication Data

US 2013/0099157 A1   Apr. 25, 2013

(51) Int. Cl.
 *C09K 5/00* (2006.01)
(52) U.S. Cl.
 USPC ........... 252/78.3; 252/70; 252/71; 252/73; 252/77; 252/78.5
(58) Field of Classification Search
 USPC ................. 252/70, 72, 73, 77, 78.3, 79
 See application file for complete search history.

(56) References Cited

U.S. PATENT DOCUMENTS

| | | | | | |
|---|---|---|---|---|---|
| 4,367,154 | A | * | 1/1983 | Jernigan | 252/78.3 |
| 4,707,286 | A | * | 11/1987 | Carr | 252/75 |
| 4,772,408 | A | * | 9/1988 | Mohr et al. | 252/75 |
| 2003/0218150 | A1* | | 11/2003 | Blakemore et al. | 252/73 |
| 2005/0269548 | A1* | | 12/2005 | Jeffcoate et al. | 252/71 |
| 2006/0054564 | A1* | | 3/2006 | Woyciesjes et al. | 210/697 |
| 2007/0120094 | A1* | | 5/2007 | Yang et al. | 252/389.2 |

OTHER PUBLICATIONS

"Colloidal Silica", Grace.com, copyright 2012.*
STIC search report results of Dec. 11, 2012.*

* cited by examiner

*Primary Examiner* — Peter F Godenschwager
*Assistant Examiner* — Jane L Stanley
(74) *Attorney, Agent, or Firm* — Merchant & Gould

(57) ABSTRACT

The technology of this invention relates to an aqueous heat transfer solution exhibiting enhanced stability as well as thermal conductivity. The solution comprises silicon oxide nanoparticles, to which a freezing point depressant may potentially be added. The solution provides protection against forms of corrosion for use in applications where cooling is critical. The invention also covers the use of a concentrate as well as the dilution made from the concentrate.

20 Claims, 2 Drawing Sheets

COOLANT FORMULATIONS

FIELD OF TECHNOLOGY

The current invention focuses on stabilized heat transfer formulations which comprise silicon oxide nanoparticles.

BACKGROUND

Heat-transfer fluids are used as heat carriers in many applications, particularly as coolants or antifreeze. Examples of use of heat-transfer fluids include the removal or exchange of excess heat from stationary and automotive internal combustion engines, heat generated by electrical motors and generators, process heat and condensation heat (e.g. in refineries and steam generation plants), electronic equipment or fuel cell systems. In all of these applications the thermal conductivity and heat capacity of the heat-transfer fluid are important parameters in the development of energy-efficient heat-transfer equipment. To improve the total efficiency of their equipment, industries have a strong need to develop heat-transfer fluids with significantly higher thermal conductivities than presently available.

Historically, water has been the preferred fluid when considering heat transfer. In many applications, antifreeze properties are needed and the water is mixed with freezing point depressants like alcohols, glycols or salts. Such mixtures do have a decreased heat transfer capability in comparison with pure water but are still preferred above liquids like organic oil, silicone oil or synthetic esters.

Certainly in the cooling of an internal-combustion engine, motors and the like, heat transfer mediums for hot-water supply, heating, cooling and freezing systems, heat transfer mediums for a snow melting system, road heating, industrial cooling installations, power generation systems and even fuel cell and battery cooling, aqueous solutions are still the preferred option from a heat transfer perspective.

The heat exchange property of heat transfer mediums is controlled by the specific heat, density, viscosity and thermal conductivity of its base fluids. These heat transfer parameters are, to a limited extent, impacted by the addition of minor amount of the normal additives like corrosion inhibitors, scale inhibitors, stabilizers, antioxidant, buffers, de-foamers, and dyes. Although its use dominates the engine coolant market, water/glycol mixtures and even pure aqueous solutions do not always give sufficient heat transfer performance in high demanding system where the thermal load has reached its limit.

SUMMARY OF THE INVENTION

The present invention is focused on the stabilization of silica colloids and provides an improved heat transfer medium liquid composition that is not only high in thermal conductivity but also has an excellent dispersion stability even in contact with heat emitting surfaces as is the case in combustion engines. The aqueous heat transfer medium liquid composition of this invention containing, as the main component, and mixture of water, alcohol and low molecular organic salts. One embodiment of this invention is a concentrate, comprising components a, b and c below which may be mixed with water to form a liquid composition.

An aqueous heat transfer medium composition of this invention exhibiting enhanced stability as well as thermal conductivity, said composition comprising, in addition to water:

(a) at least one type of silica colloid particle, each particle having an average particle diameter in the range of from 0.1 to 1000 nm;
(b) at least one type of metal corrosion inhibitor;
(c) at least one type of phosphonate functional siliconate having the structure given in FIG. 1, wherein $R_1$ is a water solubilizing group, $R_2$ is hydrogen, an alkyl of 1 to 3 carbons, or a water-soluble cation such as sodium, potassium, ammonium, and the like. $R_3$, an alkyl of 1 to 8 carbons, may be substituted with an hydroxy, amine, halide or alkoxy of 1 to 3 carbons.

DETAILED DESCRIPTION OF THE INVENTION

Figure 1:
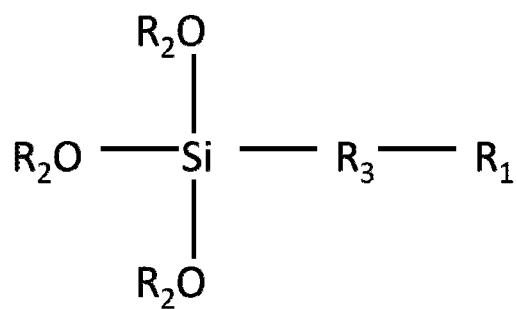
FIG. 1 is a phosphonate functional siliconate.
Figure 2:
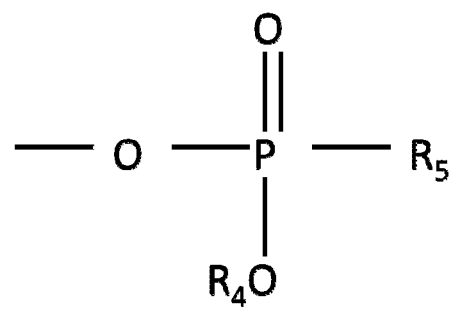
FIGS. 2 and 3 are two different embodiments of $R_1$ in FIG. 1.
Figure 3:
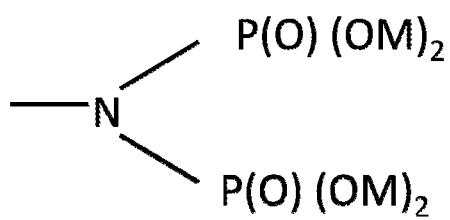

Nanoparticles.

Solids have larger thermal conductivities than fluids (e.g. copper oxide 76.5 W/m.K; silicon oxide 1.38 W/m.K, versus water 0.613 W/m.K; monoethylene glycol 0.252 W/m.K, typical oil 0.107 W/m.K) with metallic particles even several orders of magnitude higher values than fluids (e.g. copper 401 W/m.K, aluminum 237 W/m.K). The thermal conductivities of fluids that contain suspended solids have also been found to be enhanced when compared with conventional fluids. Many theoretical and experimental studies of the effective thermal conductivity of dispersions that contain solid particles have been conducted since Maxwell's theoretical work published in 1881, *An Elementary Treatise on Electricity*.

The use of nano-particles was proposed (S.U.-S. Choi, *ASME Congress*, San Francisco, Calif., Nov. 12-17, 1995) in heat-transfer fluids such as water, ethylene glycol and engine oil to produce a new class of engineered fluids (nanofluids) with improved heat-transfer capabilities. S.U.-S. Choi et Al. (*ASME Transactions* 280, Vol. 121, May 1999) report thermal conductivity measurements on fluids containing $Al_2O_3$ and CuO nano-particles. These experiments have shown that nanofluids, containing only a small amount of nano-particles, have substantial higher thermal conductivities than the same liquids (water, ethylene glycol) without nano-particles.

Many studies focus on the inclusion of metals and corresponding metal oxides of copper and aluminum towards aqueous or aqueous/glycol solutions. Those metals and corresponding metal oxides have the advantage that high thermal conductivity can be added to the solution. By proper selection of the size and size distribution of those particles the dispersibility is optimized and creates the effect that the thermal conductivity of the heat transfer medium itself can be enhanced. In this invention, the particles are present in the range from about 0.1% to about 40 wt %. and are preferably monodisperse nonaggregated spherical particles.

Some limited studies are published on the use of concentrated silica colloids to enhance the thermal properties of the liquid. Hwang et al. 2007 (*Thermochimica Acta* 455; 70-74) reports a 3% increase in thermal conductivity when adding 1 vol % $SiO_2$ nanoparticles (average diameter: 12 nm) to water. Wu et al. 2010 (*Physical Review E* 81, 011406) showed that nanoparticle clustering has an effect on the effective thermal conductivity of concentrate silica colloids.

However, since various kinds of corrosion inhibitors are added to heat transfer fluid and coolants in order to inhibit corrosion of metal parts of the equipment, the well dispersed colloidal metal and metal oxide solutions might not be stable as a consequence of interaction with anionic metal corrosion inhibitors, resulting in agglomeration and drop-out of solution. In the end the theoretical enhanced thermal conductivity based on dispersing metal fine particles will not be obtained and even worse the formed drop out negatively affect as well the heat transfer as the material life time of the components in the cooling system.

Freezing Point Depressants

The aqueous heat transfer medium of this invention may optionally contain a freezing point depressant. In such situations the water is generally present from 5 to 60 wt % in admixture with 10 to 95 wt. % freezing point depressant. The freezing point depressant is usually an alcohol or earth alkali metal salt. The alcohol is often a glycol. The glycol may be typically an ethylene glycol, diethylene glycol, propylene glycol, dipropylene glycol; triethylene glycol, tetraethylene glycol, pentaethylene glycol, hexaethylene glycol, dipropylene glycol, tripropylene glycol, tetrapropylene glycol, pentapropylene glycol, hexapropylene glycol mono ethylene glycol, or mono propylene glycol. The alcohol may alternately be selected from methanol, ethanol, propanol, butanol, furfurol, tetrahydrofurfuryl, ethoxylated furfuryl, dimethyl ether of glycerol, sorbitol, 1,2,6 hexanetriol, trimethylolpropane, methoxyethanol, and glycerin. If an alkali metal salt is used, it is commonly a salt of an acid or mixture of acids selected from the group consisting of acetic acid, propionic acid, succinic acid, betaine and mixtures thereof.

Phosphonate Functional Siliconates—The components have two functions. The first function is to interact with the surface of the nanoparticle to be stabilized. The second function is to create an affinity towards the carrier fluid, in which the nanoparticle is thus dissolved. Since the stabilized nanoparticles consist of silica colloidal particles, the use of silicon containing groups provides a good anchor mechanism for the absorption of the stabilizer. On the other end of the molecule, there is a functional group that is easily dissolvable in a polar matrix like in the water mixtures with alcohols and/or neutralized acids or a combination thereof. In order to provide long term effectiveness the component used must have thermal as well as chemical resistance during operation and should hold fast to the nanoparticles that it stabilizes during engine operation.

The phosphonate functional siliconate, (also shown as FIG. 1) has the following structure:

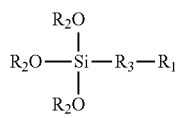

wherein $R_1$ is a water solubilizing group, $R_2$ is selected from the group consisting of hydrogen, an alkyl group of from 1 to 3 carbons, or a water-soluble cation, and $R_3$ is an alkyl group.

The water soluble cation of $R_2$ may be selected, in some cases, from the group consisting of Group I metals and ammonium. $R_3$ is preferably substituted with a hydroxyl, amine, halide or alkoxy group rather than with an alkyl group, and preferably $R_3$ consists of no more than 8 carbons.

The water solubilizing function $R_1$ may be a phosphonate of following structure

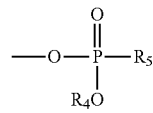

wherein $R_4$ is from the group consisting of hydrogen, an alkyl group or a water soluble cation and $R_5$ is an alkyl group. The alkyl groups of $R_4$ and $R_5$ consist of no more than 5 carbons.

The water solubilizing function $R_1$ of the phosphonate functional siliconate could also be a functionalized amine of following structure

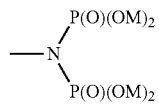

wherein M is hydrogen or a water-soluble cation.

Additional Additives

The antifreeze composition may further contain other additives in an amount of 0.05 to about 0.1 wt. % (based on the weight of the freezing point depressant matrix) such as antioxidants, anti-wear agents, detergents, antifoam agents, acid-base indicators, dyes and the like, provided that the additives are soluble and thermally stable at low temperatures.

Examples of antifoam agents used include but are not limited to polyalkylene oxide having a molecular weight of from about 1,000 to about 4,000; silicon oils such as dimethylpolysilozane; and organic silicon compounds such as diethyl silicates.

Examples of antioxidants include but are not limited to phenols, such as 2,6di-t-butyl methylphenol and 4,4'-methylene-bis(2,6-di-t-butylphenol); aromatic amines, such as p,p-dioctylphenylamine, monooctyldiphenylamine, phenothiazine, 3,7-ioctylphenothiazine, phenyl-1-naphthylamine, phenyl-2-naphthylamine, alkylphenyl-1-naphthatalamines and alkyl-phenyl-2-naphthal-amines, as well as sulphur-containing compounds, e.g. dithiophosphates, phosphites, sulphides and dithio metal salts, such as benzothiazole, tin-dialkyldithiophosphates and zinc diaryldithiophosphates.

Examples of antiwear agents include but are not limited to phosphates, phosphate esters, phosphites, thiophosphites, e.g. zinc dialkyl dithiophosphates, zinc diaryldithiophosphates, tricresyl phosphates, chlorinated waxes, sulphurised fats and olefins, such as thiodipropionic esters, dialkyl sulphides, dialkyl polysulphides, alkyl-mercaptanes, dibenzothiophenes and 2,2'-dithiobis(benzothiazole); organic lead compounds, fatty acids, molybdenum complexes, such as molybdenum disulphide, halogen substituted organosilicon compounds, organic silicon compounds, borates and halogen-substituted phosphorus compounds.

Examples of detergents include but are not limited to sulphonates, aromatic sulphonic acids, which are substituted with alkyl having a long chain, phosphonates, thiophosphonates, phenolates, metal salts of alkylphenols, and alkyl sulphides.

EXAMPLES

To enable the evaluation of the stability of the silica colloid the ASTM D4340-10 test method was used. In this test method, a heat flux is established through a cast aluminum alloy (SAE 329 Aluminum alloy also known in the unified numbering system for metals and alloys, SAE-ASTM 4th edition as UNS A03190) typically used for cylinder head. The metal is in contact with the coolant under a pressure of 193 kPa and the temperature of the specimen is maintained at 135° C. for the complete test duration of 1 week (168 h). The stability in this heat rejecting corrosion test is taken as indication of the performance level for the solution. The ASTM limit and customer specifications using this test methodology (for coolants which do not contain nanoparticles) are weight losses lower than 1 mg/week.cm². In this test corrosion is reflected by a weight loss (positive value) and instability leading to drop-out and adherence to the heat emitting aluminum surface by a weight increase (negative value). Without addition of nanoparticles, such as the silica colloid particles used in this invention the drop out of the unstable particles results in a considerable weight increase (negative value). The effective stabilization of the nanoparticles still provides a slight weight gain but orders of magnitude lower in comparison with the in improperly stabilized particles For the stability tests performed a collodial silica was used with the following properties: 40 wt % $SiO_2$ suspension in water (equals a 23.3% volume fraction), $SiO_2$ surface area of 220 m²/g and a density of 1.3 g/ml at 25° C. This material was commercially obtained from Aldrich under the name LUDOX® HS-40 colloidal silica 40 wt. % suspension in $H_2O$.

To achieve the above purpose an aqueous heat transfer medium liquid composition characterized by containing water and/or alcohol and/or low molecular organic salts is used as the main component.

Example 1 (Comparative Example)

A coolant fluid was prepared comprising 50 wt % of water and 50 wt % of a colloidal silica and brought to a pH of 9.8 with sodium hydroxide.

Example 2 (Comparative Example)

A coolant fluid was prepared comprising 49.538 wt % of water, 50 wt % of a colloidal silica and 0.462 wt % 3-(trishydroxysilyl)-1-propanesulfonic acid and brought to a pH of 9.8 with sodium hydroxide.

Example 3 (Comparative Example)

A coolant fluid was prepared comprising 49.5 wt % of water, 50 wt % of a colloidal silica and 0.5 wt % carboxyethylsilanetriol and brought to a pH of 9.8 with sodium hydroxide.

Example 4

A coolant fluid was prepared comprising 49.94 wt % of water, 50 wt % of a colloidal silica and 0.06 wt % sodium 3-trishydroxysilylpropylmethylphosphonate and brought to a pH of 9.8 with sodium hydroxide.

Example 5

A coolant fluid was prepared comprising 49.78 wt % of water, 50 wt % of a colloidal silica and 0.12 wt % sodium 3-trishydroxysilylpropylmethylphosphonate, 0.1 wt % sodium nitrate and brought to a pH of 9.8 with sodium hydroxide.

Example 6

A coolant fluid was prepared comprising 49.88 wt % of water, 50 wt % of a colloidal silica and 0.12 wt % sodium 3-trishydroxysilylpropylmethylphosphonate and brought to a pH of 9.8 with sodium hydroxide.

Example 7

A coolant fluid was prepared comprising 49.82 wt % of water, 50 wt % of a colloidal silica and 0.18 wt % sodium 3-trishydroxysilylpropylmethylphosphonate and brought to a pH of 9.8 with sodium hydroxide.

Example 8

A coolant fluid was prepared comprising 49.72 wt % of water, 50 wt % of a colloidal silica and 0.18 wt % sodium 3-trishydroxysilylpropylmethylphosphonate and, 0.1 wt % sodium nitrate and brought to a pH of 9.8 with sodium hydroxide.

Example 9

A coolant fluid was prepared comprising 49.65 wt % of water, 50 wt % of a colloidal silica and 0.18 wt % sodium 3-trishydroxysilylpropylmethylphosphonate and, 0.1 wt % sodium nitrate, 0.01 wt % tolyltriazol, 0.03 wt % Sodium molybdate dehydrate, 0.03 wt % 2-phosphonobutane tricarboxylic acid and brought to a pH of 9.8 with sodium hydroxide.

TABLE 1

| | Test results | |
|---|---|---|
| Example | weight loss before chemical cleaning mg/week × cm² | weight loss after chemical cleaning mg/week × cm² |
| Example 1 (Comparative example) | −32.7 | −28.4 |
| Example 2 (Comparative example) | −185.0 | −181.1 |
| Example 3 (Comparative example) | −160.3 | −153.6 |
| Example 4 | −2.8 | −2.0 |
| Example 5 | −0.6 | −0.5 |
| Example 6 | −0.9 | −0.8 |
| Example 7 | −0.5 | −0.5 |
| Example 8 | −0.5 | −0.4 |
| Example 9 | −0.8 | −0.6 |

We claim:
1. An aqueous heat transfer medium liquid composition exhibiting enhanced stability as well as thermal conductivity, said composition comprising, in addition to water:
 (a) at least one type of silica colloid particle, each particle having an average particle diameter in the range of from 0.1 to 1000 nm;
 (b) at least one type of phosphonate functional siliconate having the following structure;

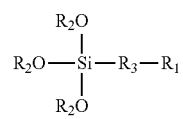

wherein $R_1$ is a water solubilizing group, $R_2$ is selected from the group consisting of hydrogen, an alkyl group of from 1 to 3 carbons, and a water-soluble cation, and $R_3$ is an alkyl group, wherein the water solubilized group $R_1$ is a functionalized amine of following structure

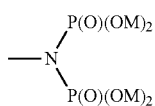

wherein M is hydrogen or a water-soluble cation; and (c) at least one kind of metal corrosion inhibitor.

2. The composition of claim 1, wherein the water soluble cation of $R_2$ is selected from the group consisting of Group I metals and ammonium.

3. The composition of claim 1, wherein the alkyl group of $R_3$ consists of no more than 8 carbons.

4. The composition of claim 1, which further comprises a freezing point depressant which is selected from the group consisting of an alcohol, and alkali earth metal salt.

5. The composition of claim 4, wherein the water is present from 5 to 60 wt % in a mixture with 10 to 95 wt % freezing point depressant.

6. The composition of claim 5, wherein the alcohol is a glycol.

7. The composition of claim 6, wherein the glycol is selected from the group consisting of ethylene glycol, diethylene glycol, propylene glycol, dipropylene glycol, triethylene glycol, tetraethylene glycol, pentaethylene glycol, hexaethylene glycol, dipropylene glycol, tripropylene glycol, tetrapropylene glycol, penta propylene glycol, hexapropylene glycol, mono ethylene glycol, and mono propylene glycol.

8. The composition of claim 5, wherein the alcohol is selected from the group consisting of methanol, ethanol, propanol, butanol, furfurol, tetrahydrofurfuryl, ethoxylated furfuryl, dimethyl ether of glycerol, sorbitol, 1,2,6-hexanetriol, trimethylolpropane, methoxyethanol, and glycerin.

9. The composition of claim 5, wherein the alkali earth metal salt is a salt of an acid or mixture of acids selected from the group consisting of acetic acid, propionic acid, succinic acid, and mixtures thereof.

10. The composition of claim 1, wherein the at least one kind metal corrosion inhibitor is present in the composition in an amount of about 0.01 to about 10 wt %.

11. The composition of claim 1, wherein the metal corrosion inhibitor is selected from the group consisting of organic acid corrosion inhibiting agents, silicate corrosion inhibiting agents, molybdate salts, nitrate salts, hydrocarbyl triazol, hydrocarbyl thiazol derivatives, and combinations thereof.

12. The composition of claim 1 wherein the corrosion inhibitor is present in an amount sufficient to provide corrosion inhibition to metal surfaces in contact with the coolant.

13. The composition of claim 1 which further comprises at least one of member of the group consisting of dispersion agents, passivating agents, stabilization agents, and mixtures thereof.

14. The composition of claim 1, wherein the silica colloid particles are present in the composition in an amount from about 0.1% to about 40 wt %.

15. The composition of claim 1, wherein the silica colloid particles are present in the composition as monodisperse non-aggregated spherical particles.

16. The composition of claim 1, wherein the phosphonate functional siliconate is present in the composition in an amount from about 0.001 to about 5 wt %.

17. The composition of claim 1, said composition having a pH in the range from 7.0 to 11.0.

18. The composition of claim 17, said composition having a pH in the range from 8.5 to 10.5.

19. The composition of claim 1 which further comprises at least one member selected from the group consisting of anti-oxidants, anti-wear agents, detergents, antifoam agents, acid-base indicators and dyes.

20. A concentrate which, when mixed with water, forms an aqueous heat transfer medium liquid composition exhibiting enhanced stability as well as thermal conductivity, said concentrate comprising:

(a) at least one type of silica colloid particle, each particle having an average particle diameter in the range of from 0.1 to 1000 nm;

(b) at least one type of phosphonate functional siliconate having the following structure;

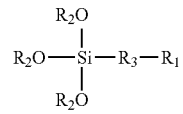

wherein $R_1$ is a water solubilizing group, $R_2$ is selected from the group consisting of hydrogen, an alkyl group of from 1 to 3 carbons, and a water-soluble cation, and $R_3$ is an alkyl group, wherein the water solubilized group $R_1$ is a functionalized amine of following structure

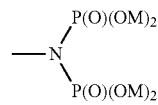

wherein M is hydrogen or a water-soluble cation; and (c) at least one kind of metal corrosion inhibitor.

* * * * *